United States Patent [19]

Norling et al.

[11] Patent Number: 5,287,744
[45] Date of Patent: Feb. 22, 1994

[54] ACCELEROMETER WITH FLEXURE ISOLATION

[75] Inventors: Brian L. Norling, Mill Creek; Mitchell J. Novack, Kirkland; Peter H. LaFond, Redmond, all of Wash.

[73] Assignee: Sundstrand Corporation, Rockford, Ill.

[21] Appl. No.: 899,816

[22] Filed: Jun. 16, 1992

Related U.S. Application Data

[63] Continuation of Ser. No. 535,785, Jun. 11, 1990, abandoned.

[51] Int. Cl.⁵ .............................................. G01P 15/08
[52] U.S. Cl. .................................. 73/497; 73/517 AV
[58] Field of Search ................. 73/497, 517 R, 517 B, 73/517 AV

[56] References Cited

U.S. PATENT DOCUMENTS

| | | | |
|---|---|---|---|
| 4,182,187 | 1/1980 | Hanson | 73/497 |
| 4,250,757 | 2/1981 | Hanson | 73/517 B |
| 4,766,768 | 8/1988 | Norling et al. | 73/497 |
| 4,926,689 | 5/1990 | Hanson | 73/497 |
| 4,932,258 | 6/1990 | Norling | 73/497 |

Primary Examiner—John E. Chapman
Attorney, Agent, or Firm—Fitch, Even, Tabin & Flannery

[57] ABSTRACT

A stress isolation technique for an accelerometer of the type that has a reed that includes a paddle, a support, and flexures connecting the paddle to an area of the support. The support includes one or more mounting pads through which the reed is mounted. The area of the support adjacent to the flexures is divided into first and second portions, such that the flexures are connected to the first portion and such that the mounting pads are positioned solely on the second portion. The flexures are therefore isolated from stress coupled into the reed through the mounting pads.

1 Claim, 3 Drawing Sheets

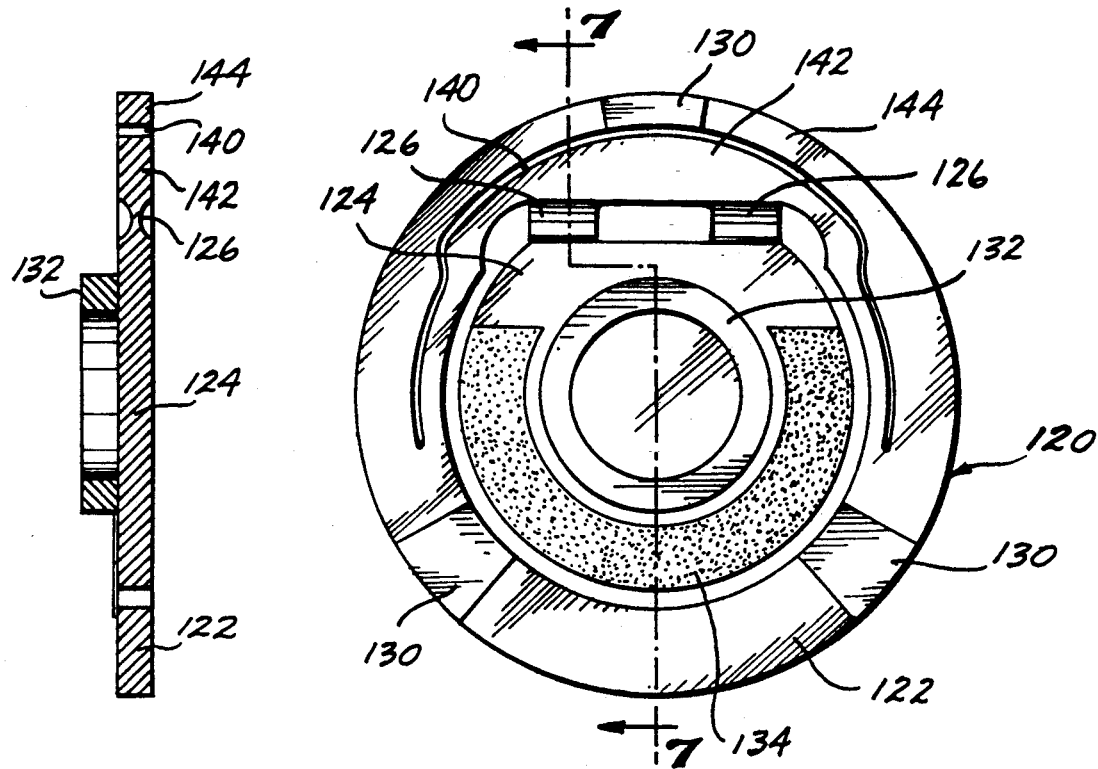
*Fig. 7.*  *Fig. 6.*
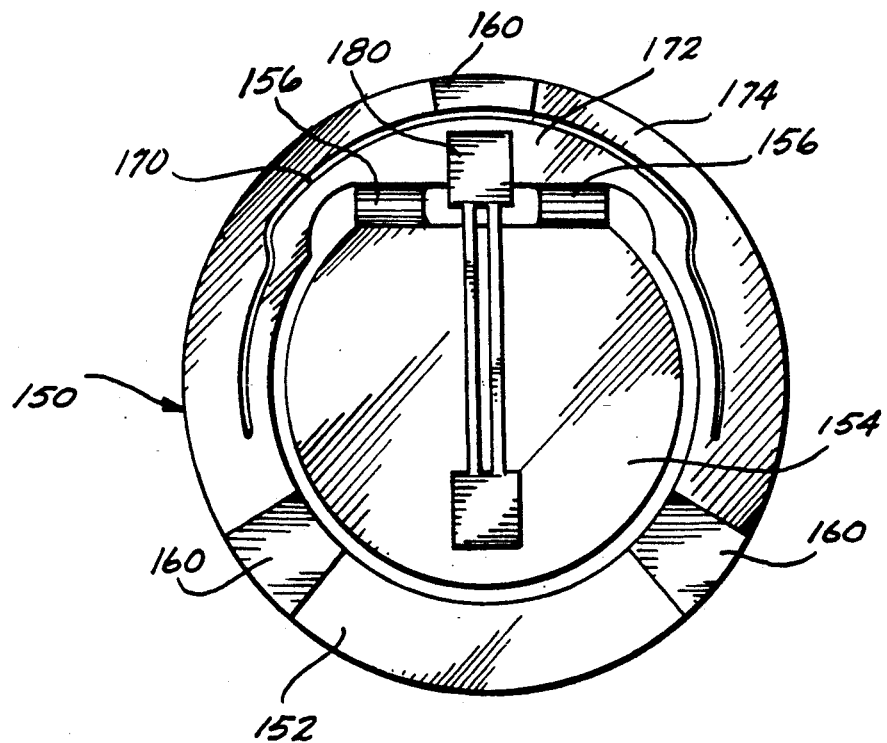
*Fig. 8.*

ACCELEROMETER WITH FLEXURE ISOLATION

CROSS-REFERENCE TO RELATED APPLICATION

This application is a continuation of application Ser. No. 07/535,785, filed Jun. 11, 1990, abandoned.

FIELD OF THE INVENTION

The present invention relates to accelerometers in which a proof mass is mounted to a support by flexures.

BACKGROUND OF THE INVENTION

A prior art accelerometer with high performance potential is described in U.S. Pat. No. 3,702,073. The accelerometer comprises three primary components, a reed, and upper and lower stators or magnetic circuits between which the reed is supported. The reed includes a movable paddle that is suspended via flexures to an outer annular support ring, such that the paddle can pivot with respect to the support ring. The paddle, flexures and support ring are commonly provided as a unitary structure composed of fused quartz.

Both upper and lower surfaces of the paddle include capacitor plates and force balancing coils. Each force balancing coil is positioned on the paddle such that the central axis of the coil is normal to the top and bottom surfaces of the paddle, and parallel to the sensing axis of the accelerometer. A plurality of mounting pads are formed at spaced-apart positions around the upper and lower surfaces of the annular support ring. These mounting pads mate with inwardly facing surfaces of the upper and lower stators when the accelerometer is assembled.

Each stator is generally cylindrical, and has a bore provided in its inwardly facing surface. Contained within the bore is a permanent magnet. The bore and permanent magnet are configured such that an associated one of the force balancing coils mounted on the paddle fits within the bore, with the permanent magnet being positioned within the cylindrical core of the coil. Current flowing through the coil therefore produces a magnetic field that interacts with the permanent magnet to produce a force on the paddle. Also provided on the inwardly facing surfaces of the stators are capacitor plates configured to form capacitors with the capacitor plates on the top and bottom surface of the paddle. Thus movement of the paddle with respect to the upper and lower stators results in a differential capacitance change.

In operation, the accelerometer is affixed to an object whose acceleration is to be measured. Acceleration of the object along the sensing axis results in pendulous, rotational displacement of the paddle with respect to the support ring and the stators. The resulting differential capacitance change caused by this displacement is sensed by a feedback circuit. In response, the feedback circuit produces a current that, when applied to the force balancing coils, tends to return the paddle to its neutral position. The magnitude of the current required to maintain the paddle in its neutral position provides a measure of the acceleration along the sensing axis.

Prior accelerometer designs of the type described above have in general taken two different approaches to the mounting of the reed. In one approach, three mounting pads are equally spaced from one another around the support ring, and the reed is clamped between the stators via such mounting pads. This arrangement results in at least one mounting pad being close to the area of the support ring to which the flexures are attached. Mounting strains and thermal strains are therefore coupled into the flexures, causing bias sensitivities to mounting and temperature. Overall stability of the accelerometer is thus degraded. This design does have the advantage of providing three pads that are widely separated, with at least one pad on each side of the magnetic circuit centerline. Preload forces can therefore be applied at the center of the accelerometer, to provide a stable clamping condition. Thus, this first approach allows for flexibility in preload system design, but results in degraded bias performance.

A second commonly used design approach involves the placement of all three mounting pads to one side of the centerline, as far as possible from the flexure area. As a result, the long support ring section between the mounting pads and the flexures provides isolation of the flexures from thermal strains and mounting strains. This approach also allows two of the mounting pads to be aligned with the centroid of pick-off capacitance, as taught in U.S. Pat. No. 4,182,187. Thus, this mounting pad arrangement results in improved bias performance, but does not allow preloads to be applied at the centerline of the accelerometer, and may degrade alignment stability.

SUMMARY OF THE INVENTION

The present invention provides a technique for isolating the flexures from strains coupled into the reed through the mounting pads, in a way that permits use of low-cost, axial preloading techniques.

In one preferred embodiment, the present invention provides an improvement for an accelerometer of the type that has a reed that includes a paddle, a support, and flexure means connecting the paddle to an area of the support adjacent to the flexure means. The flexure means supports the paddle for rotation with respect to said area of the support in response to acceleration. The accelerometer also includes mounting means for contacting one or more mounting pads on the support, to thereby mount the reed. The improvement comprises dividing the area of the support adjacent to the flexure means into first and second portions, such that the flexure means is connected to the first portion, and such that any mounting pad or portion of a mounting pad in said area is positioned solely on the second portion. The flexure means is therefore isolated from stress coupled into the reed through the mounting pad. In a preferred embodiment in which the support has an annular shape, the first and second portions comprise respective inner and outer portions of the support separated by a circumferentially extending slot.

BRIEF DESCRIPTION OF THE DRAWINGS

FIG. 6 is a plan view of a fourth preferred embodiment of a proof mass assembly utilizing the present invention;

FIG. 7 is a cross-sectional view taken along line 7—7 of FIG. 6; and

FIG. 8 is a plan view of a fifth preferred embodiment of a proof mass assembly utilizing the present invention.

DETAILED DESCRIPTION OF THE INVENTION

Figure 1:
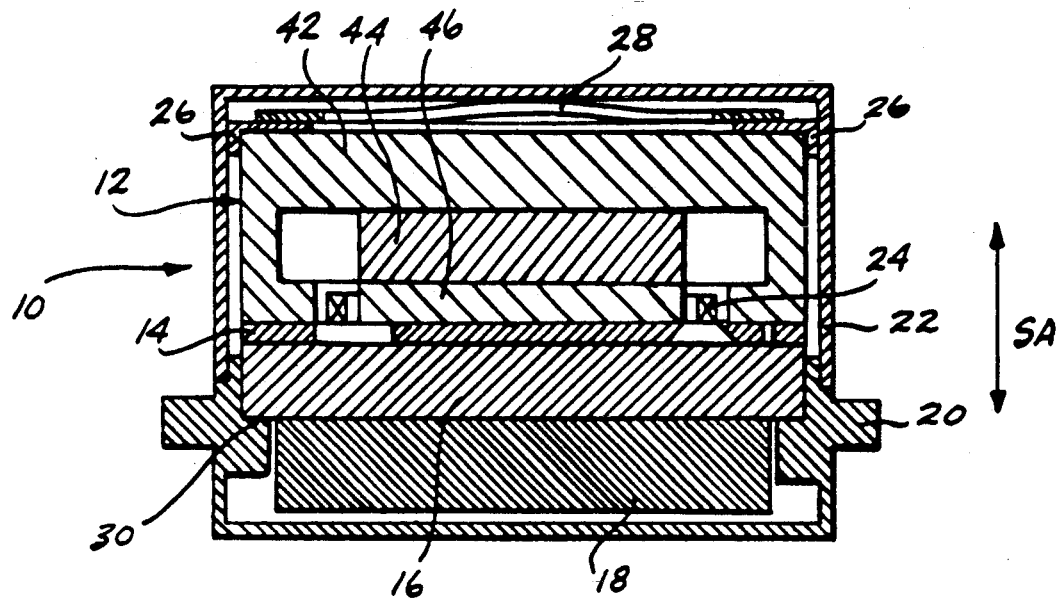
FIG. 1 is a cross-sectional view of an accelerometer that includes the proof mass mounting isolation arrangement of the present invention.
Figures 2, 3:
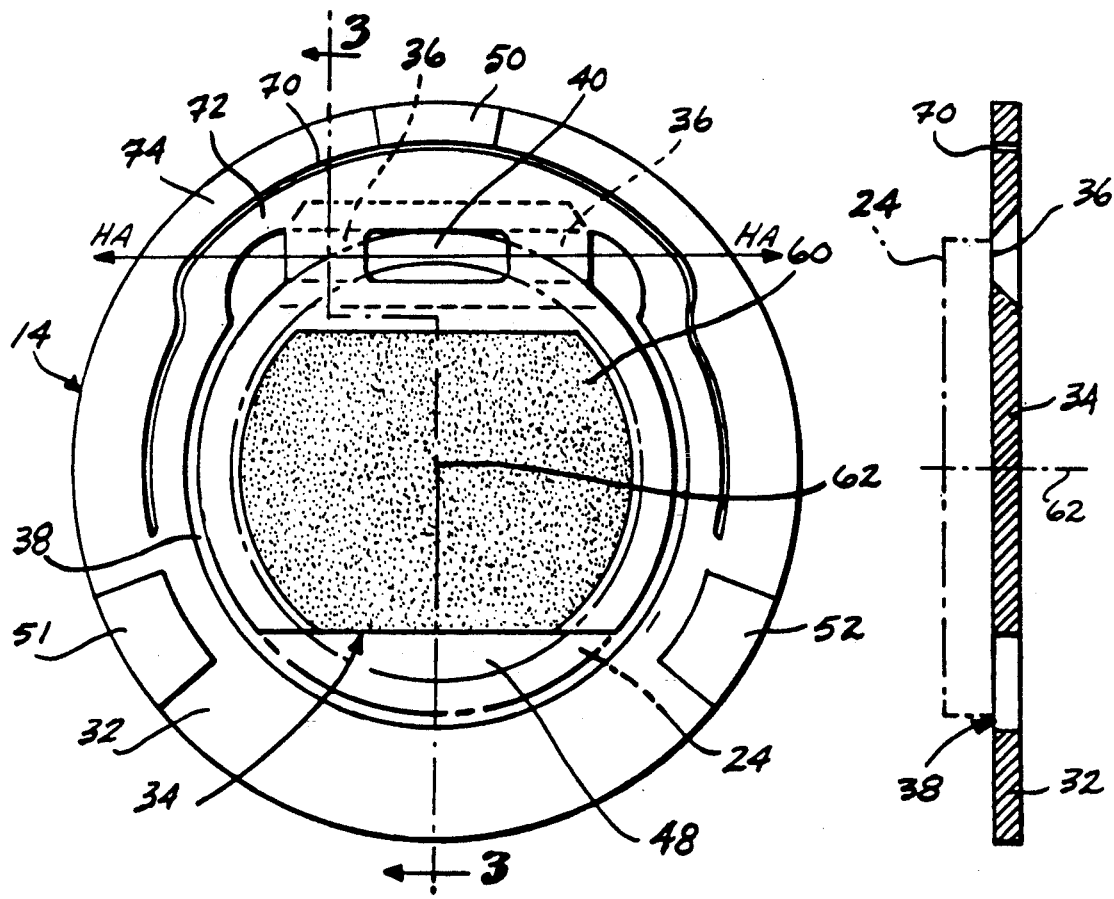
FIG. 2 is a top plan view of the reed of the accelerometer of FIG. 1.
FIG. 3 is a cross-sectional view taken along line 3—3 of FIG. 2.

FIGS. 1-3 illustrate an accelerometer that includes a flexure isolation system in accordance with the present invention. The accelerometer 10 measures acceleration along sensing axis SA, and includes stator 12, reed 14, ceramic plate 16, and electronic assembly 18, all mounted within an enclosure formed by mounting flange 20 and case 22. Reed 14 is held between ceramic plate 16 and stator 12, and has coil 24 positioned on its upper surface. Stator 12 in turn bears against case 22 via positioning ring 26 and spring washer 28.

The stator comprises excitation ring 42, magnet 44 and pole piece 46. The stator is shaped so that coil 24 occupies a comparatively narrow gap between pole piece 46 and excitation ring 42, to provide the force balancing function well known to those skilled in the art. Ceramic plate 16 is held against reed 14 by inner shoulder 30 of mounting flange 20, and the mounting flange and case 22 are interconnected by welding or by any other suitable process. Means (not shown) are provided for electrically interconnecting electronics assembly 18 with reed 14, and for providing connections between the electronics assembly and an electrical connector on the outer surface of mounting flange 20.

Reed 14 is shown in greater detail in FIGS. 2 and 3. The reed has an overall disk-like shape, and includes annular support ring 32 and paddle 34 connected to one another via a pair of flexures 36 positioned on opposite sides of opening 40. For most of its perimeter, paddle 34 is separated from support ring 32 by gap 38. Three raised mounting pads 50-52 are located at approximately equally spaced positions around support ring 32, and three similar mounting pads (not shown) are located immediately beneath the pads 50-52 on the lower surface of the support ring. In the assembled accelerometer, the upper mounting pads 50-52 contact stator 12, while the lower mounting pads contact ceramic plate 16.

Paddle 34 is mounted via flexures 36 such that the paddle can pivot with respect to support ring 32 about hinge axis HA that passes through the flexures and that is horizontal and parallel to the plane of the drawing in FIG. 2. Coil 24 is mounted on the upper surface of paddle 34, such that the outer edge of the coil is approximately coextensive with the outer edge of the paddle, except adjacent flexures 36 where the coil overhangs the flexures and opening 40. Capacitor plate 60 is positioned on paddle 34 within coil 24, and forms a capacitor with the adjacent surface of pole piece 46, or with a second capacitor plate located on the lower surface of the pole piece. The capacitor forms a portion of a pick-off circuit for detecting movement of the paddle from its null position. A second capacitor may be formed between plates (not shown) on the lower surface of paddle 34 and on the upper surface of ceramic plate 16.

In accordance with the present invention, a portion of support ring 32 adjacent to flexures 36 is divided by slot 70 into inner ring 72 and outer ring 74. Mounting pad 50 is positioned on outer ring 74 only, and the flexures are connected to inner ring 72. As a result of this arrangement, stress coupled into reed 14 via mounting pad 50 is isolated from flexures 36. The coil and capacitor plate may be electrically coupled to electronics assembly 18 via conductive strips (not shown) that extend across flexures 36 and along each side of inner ring 72 to contacts beneath mounting pads 51 and 52.

Slot 70 can be manufactured by etching, air abrasion, water jet, laser cutting, or any other suitable technique. Slot 70 preferably extends approximately halfway around support ring 32. As the length of the slot is reduced, the degree of isolation is likewise reduced. On the other hand, as the slot length increases beyond the illustrated half-circumference length, inner ring 72 may become too flexible, leading to significant bending of the inner ring in response to acceleration.

The described split support ring approach allows mounting pad 50 to be located near flexures 36, on outer ring 74, without creating direct mechanical coupling of the mounting pad to the flexure area of the support ring. In addition, the evenly spaced distribution of mounting pads 50-52 about the circumference of the support ring permits the center of preload force to be located almost anywhere within the diameter of the proof mass assembly. The preferred location is on centerline 62, to provide equal mounting pad loading. This low sensitivity with respect to the exact position of the center of preload force allows the use of low-cost preload techniques, such as spring washer 28 shown in FIG. 1.

Figure 4:
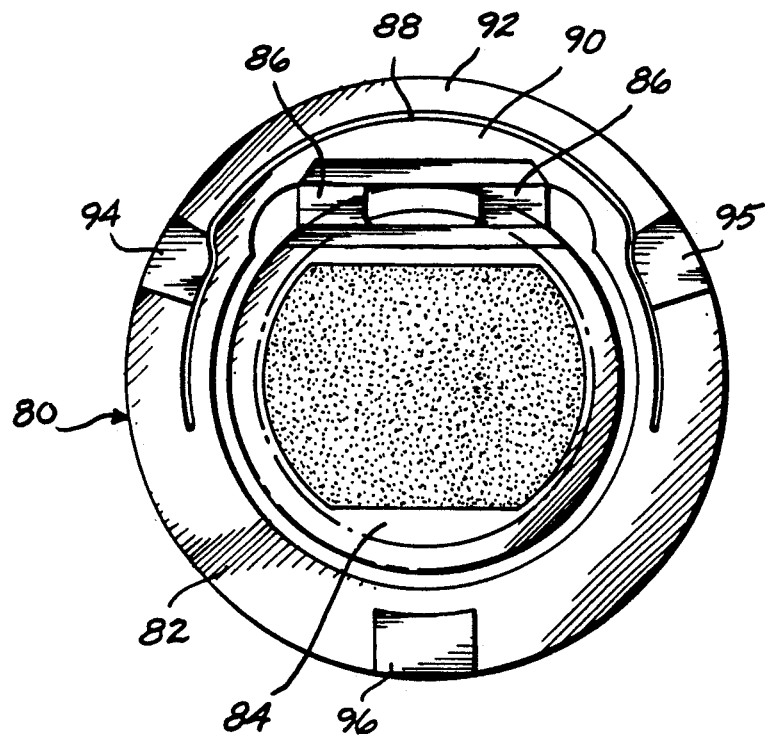
FIG. 4 is a plan view of a second preferred embodiment of a proof mass assembly utilizing the present invention.

FIG. 4 illustrates a second preferred embodiment of the reed in accordance with the present invention. Reed 80 comprises support ring 82 from which paddle 84 is supported via flexures 86. In the area adjacent to flexures 86, support ring 82 is divided by slot 88 into inner ring 90 and outer ring 92, in a manner similar to that shown in FIG. 2. However in the embodiment of FIG. 4, mounting pads 94-96 are rotated approximately 60° with respect to the mounting pads shown in FIG. 2, such that mounting pads 94 and 95 are both adjacent to flexures 86, and both are separated from the flexure area by slot 88.

Figure 5:
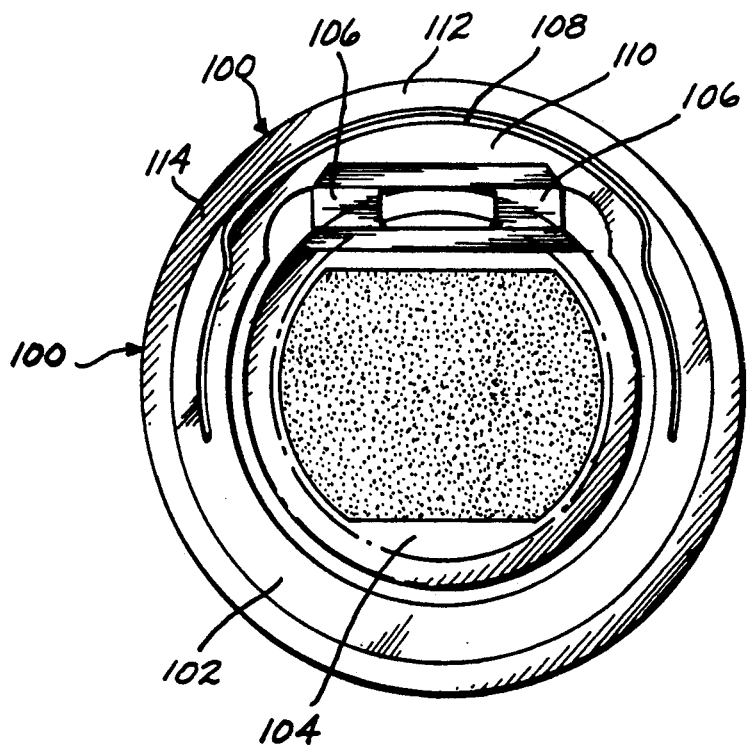
FIG. 5 is a plan view of a third preferred embodiment of a proof mass assembly utilizing the present invention.

A third embodiment of the invention is illustrated by reed 100 shown in FIG. 5. As with previously described embodiments, the reed comprises support ring 102 and paddle 104 interconnected by flexures 106, with the portion of support ring 102 in the vicinity of the flexures being divided by slot 108 into inner ring 110 and outer ring 112. In the embodiment of FIG. 5, a continuous mounting pad or mounting ring 114 entirely circles the support ring, and is positioned only on outer ring 112 in the portion of the support ring that is divided by slot 108. This continuous mounting pad provides a complete contamination barrier for the sensor.

FIGS. 6 and 7 illustrate a fourth preferred embodiment of reed 120. This reed includes annular support ring 122 and paddle 124 connected to one another by flexures 126. The support ring includes three equally spaced mounting pads 130, and three similar pads (not shown) on the opposite side of the reed. Coil 132 is centrally mounted on the upper surface of paddle 124, and capacitor plate 134 is also mounted on the paddle surface, and forms an arcuate shape partially surrounding the coil. A portion of support ring 122 adjacent to flexures 126 is divided by slot 140 into inner ring 142 and outer ring 144. Mounting pad 130 is positioned on outer ring 144 only, and the flexures are connected to inner ring 142, thus producing the isolation described for previous embodiments.

A fifth preferred embodiment of the invention is shown in FIG. 8. This embodiment includes reed 150 that comprises annular support ring 152 and paddle 154 connected to one another by flexures 156. Mounting pads 160 are positioned on the support ring, in the same manner as shown in the embodiments of FIGS. 2-3 and 6-7. The support ring is divided by slot 170 into inner ring 172 and outer ring 174. The mounting pad 160 adjacent to flexures 156 is connected to outer ring 174 only. Force transducer 180 is connected between paddle 154 and a portion of inner ring 172 between flexures 156. The force transducer may comprise a conventional double-ended tuning fork crystalline quartz device. In this embodiment, slot 170 serves to isolate the mounting pads from the point of connection of force transducer 180 to the support ring.

The use of a slot to divide a portion of the support ring into a first portion containing mounting pads and a second portion connected to the flexures may be used not only to achieve the goals described above, but also to compensate for an imbalanced force applied to the support ring, as described in commonly assigned U.S. patent application Ser. No. 07/212,785, filed Jun. 29, 1988, entitled STRESS COMPENSATED TRANSDUCER, herein expressly incorporated by reference. By comparing FIG. 4 of the present application with FIGS. 12 and 13 of the incorporated reference, it may be seen that the support ring, together with the positioning of the mounting pads, may be used to ensure that the centroid of capacitance of the capacitor plate does not shift in response to the application of a particular force to the inner portion of the support ring. In general, the compensation is accomplished by aligning the centroid of capacitance with a deflection axis about which the support deflects under the applied imbalanced force.

While the preferred embodiments of the invention have been illustrated and described, variations will be apparent to those skilled in the art. For example, the isolation technique of the present invention is fully applicable to accelerometers of the type shown in U.S. Pat. No. 3,702,073, wherein force coils, capacitor plates and magnetic circuits are positioned on both sides of the reed. In addition, in the force rebalance embodiments shown in FIGS. 1-7, the invention is not limited to capacitive position sensing means, but is also applicable to embodiments in which the position sensing means is inductive, electrostatic, optical, or of any other known technique.

The embodiments of the invention in which an exclusive property or privilege is claimed are defined as follows:

1. In an accelerometer for measuring acceleration along a sensing axis, the accelerometer having a reed that includes a paddle, a support and means including a flexure for providing a flexural connection between the paddle and the support such that the flexure supports the paddle for movement with respect to said support in response to acceleration, the support including at least one mounting pad, the accelerometer further comprising mounting means for contacting the mounting pad to thereby mount the reed, the improvement wherein said support means includes means including an inner ring and an outer ring coupled to each other, said outer ring being coupled to said mounting pad and said inner ring being disposed between said outer ring and said flexure for supporting said flexure while isolating said flexure from stresses coupled into the reed through the mounting pad and wherein the accelerometer further comprises a force transducer connected between the inner ring and the paddle.

* * * * *